(12) United States Patent
Verschueren

(10) Patent No.: US 8,575,786 B2
(45) Date of Patent: Nov. 5, 2013

(54) DEVICE AND METHOD FOR ADDRESSING POWER TO A LOAD SELECTED FROM A PLURALITY OF LOADS

(75) Inventor: Alwin Rogier Martijn Verschueren, 'S-Hertogenbosch (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/487,305

(22) Filed: Jun. 4, 2012

(65) Prior Publication Data
US 2012/0235590 A1 Sep. 20, 2012

Related U.S. Application Data

(63) Continuation of application No. 12/306,736, filed as application No. PCT/IB2007/052581 on Jul. 3, 2007, now Pat. No. 8,212,393.

(30) Foreign Application Priority Data
Jul. 7, 2006 (EP) .................................. 06116818

(51) Int. Cl.
H01H 7/00 (2006.01)
H02J 3/14 (2006.01)

(52) U.S. Cl.
USPC ............................................ 307/141; 307/38

(58) Field of Classification Search
USPC ...................................................... 307/38, 141
See application file for complete search history.

(56) References Cited

U.S. PATENT DOCUMENTS

| | | | |
|---|---|---|---|
| 5,854,615 A | 12/1998 | Hush | |
| 6,157,375 A | 12/2000 | Rindal et al. | |
| 6,275,440 B2 | 8/2001 | Noda et al. | |
| 6,456,281 B1 | 9/2002 | Rindal | |
| 6,628,273 B1 | 9/2003 | Rindal et al. | |
| 6,897,839 B2 * | 5/2005 | Noguchi et al. | 345/82 |
| 7,138,995 B2 * | 11/2006 | Wang et al. | 345/212 |
| 7,180,105 B2 | 2/2007 | Potts | |
| 2002/0140686 A1 | 10/2002 | Noguchi et al. | |
| 2005/0200577 A1 | 9/2005 | Wang et al. | |
| 2007/0276891 A1 * | 11/2007 | Warner et al. | 708/277 |

* cited by examiner

*Primary Examiner* — Hal Kaplan
(74) *Attorney, Agent, or Firm* — Yuliya Mathis

(57) ABSTRACT

The invention relates to a device and method for addressing power to at least a selected load from a plurality of loads, in particular light sources in solid state lighting applications, such as decorative indoor and outdoor illumination for buildings or cars, by timing a power signal such as to power a selected load when said common timed power signal is switched to said load under control of a delayed clock signal.

12 Claims, 5 Drawing Sheets

US 8,575,786 B2

DEVICE AND METHOD FOR ADDRESSING POWER TO A LOAD SELECTED FROM A PLURALITY OF LOADS

FIELD OF THE INVENTION

The invention relates to a device and method for addressing power to at least a selected load from a plurality of loads, and in particular the invention relates to driving individual light sources in solid state lighting applications, such as decorative indoor and outdoor illumination for buildings or cars.

BACKGROUND OF THE INVENTION

In solid state lighting applications, such as decorative indoor and outdoor illumination for buildings or cars, decorative effects are generated by using large amounts of small light sources to illuminate relatively large areas. Surprising effects can be obtained by controlling and especially varying the luminescence of individual light sources in time. For independent control of multiple electrical loads, such as light sources, several solutions are known in the art. A simple solution is to provide separate wiring to each load to be controlled. This solution has the disadvantage that it is complex and inconvenient to apply in the field of solid state lighting applications, since the number of wires grows proportionally with the amount of loads, i.e. light sources. Another solution is to add logic that enables addressing each individual load. This solution has the disadvantage of being very expensive, since the amount of logic needed is proportional with the amount of loads as well.

Furthermore it is known, for example from U.S. Pat. No. 6,628,273 to address display elements by taking propagation delays of electrical signals in conductors into account. This method has the disadvantage that its use is restricted to nanosecond time ranges, which are too small for lighting applications.

OBJECT OF THE INVENTION

It is an object of the present invention to provide a method and device for addressing power to at least a selected load from a plurality of loads, in particular light sources such as light emitting diodes (LED's) or LED arrangements, without the requirement of large amounts of wires or logic.

SUMMARY OF THE INVENTION

The invention provides an electrical circuit for switching a load among a plurality of loads, the circuit comprising a plurality of cascaded subcircuits, matching the number of loads. When cascading the subcircuits, the total amount of wires remains constant.

In an aspect, the invention comprises an electrical circuit for addressing power to at least a selected load from a plurality of loads, the circuit comprising a plurality of cascaded subcircuits, each subcircuit for powering one of the loads, each subcircuit comprising a first input terminal for receiving a timed common power signal, a delay element for delaying a clock signal received on a second input terminal, the delay element for outputting a delayed clock signal on a output terminal, a switching element for switching the common timed power signal to the load, the switching under control of the delayed clock signal.

In another aspect, the invention relates to a method for independently controlling a single load among a plurality of loads, according to claim 10.

DETAILED DESCRIPTION OF EXAMPLES

Figure 1A:
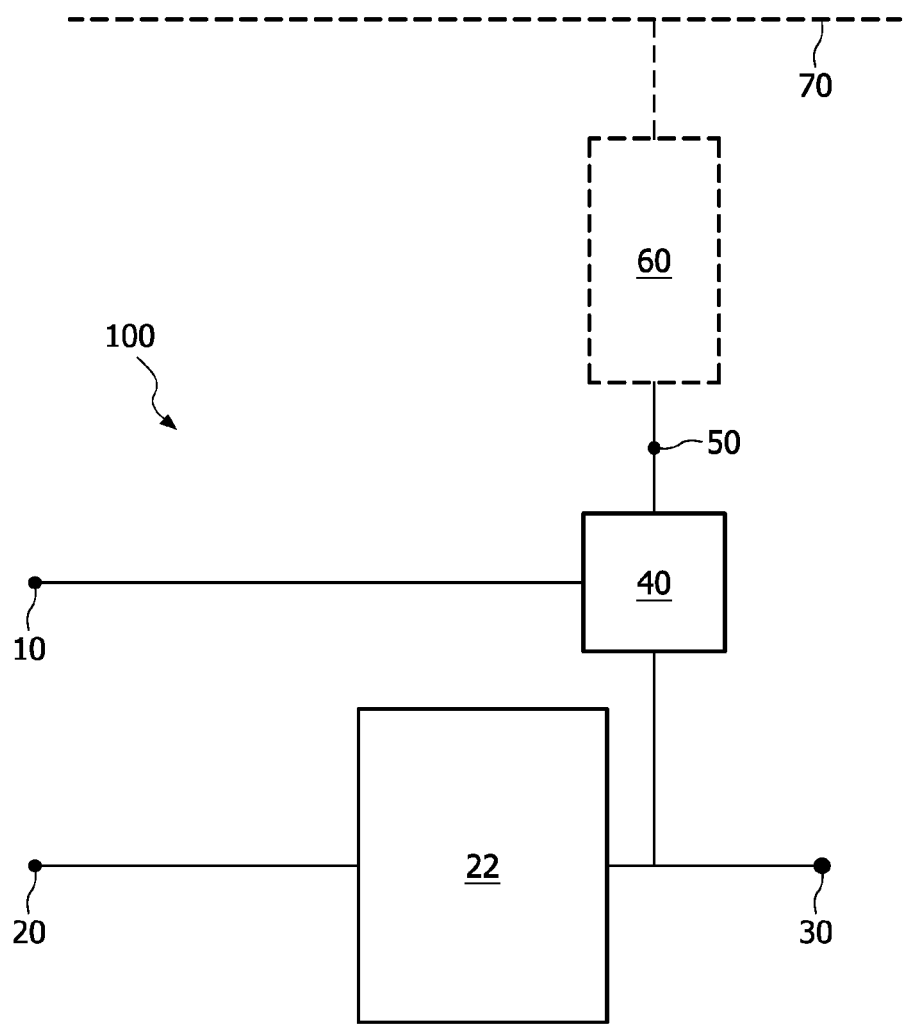
FIG. 1a shows a generic scheme of a subcircuit for forming a circuit according to the present invention.

FIG. 1a shows a generic scheme of a subcircuit 100 for forming a circuit according to the present invention. The subcircuit comprises a first input terminal 10 for receiving a timed common power signal and a second input terminal 20 for receiving a clock signal with frequency $f$. The clock signal is output with a predetermined phase delay by delay element 22 to output 30 which is also connected to switching element 40 for switching the load. The switching element 40 is further coupled with the timed common power signal, and has a switching output 50 for being connected with a load. In FIG. 1a a dashed load 60, not being part of a general embodiment of the invention, is drawn between switching output 50 and dashed power supply line 70, which also does not form a part of a general embodiment of the invention.

Subcircuit 100 is configured to couple the switching output 50 with input 10, when a low value of the timed common power signal on input 10 coincides with a high value of the delayed clock signal at output 30. At that coincidence the load is powered by the voltage difference of the power supply line and the timed common power signal.

Figure 1B:
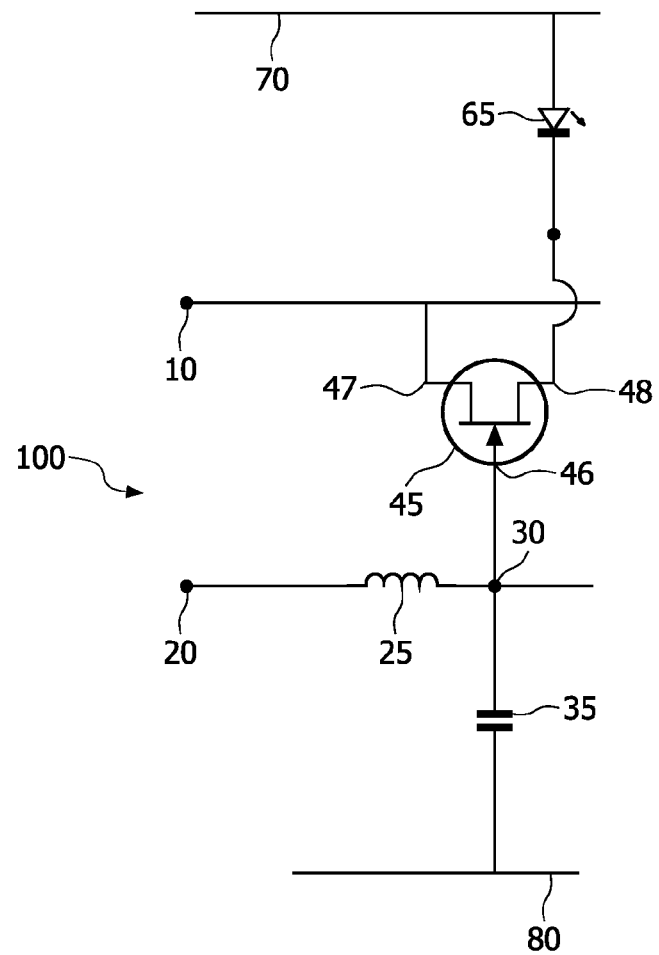
FIG. 1b shows a scheme of a subcircuit for forming a circuit according to an embodiment of the present invention.

FIG. 1b shows an embodiment of the subcircuit 100 of FIG. 1a, in which electric components are shown. Inductance 25 of L Henry is connected between input terminal 20 and output terminal 30, and capacitor 35 of C Farad is connected between output terminal 30 and ground line 80. Switch 40 from FIG. 1a is embodied by FET 45, of which gate 46 is coupled with output terminal 30 of the subcircuit, and of which source 47 is coupled with input terminal 10. Drain 48 forms switching output 50, to which a load, embodied by LED light source 65 is connected, which LED is further connected to power supply line 70. In particular, FET 45 is chosen to be a JFET of type Philips BF 245C, supporting a channel current up to 25 mA, which matches the current required for driving the LED's. Inductance 25 and capacitor 35 form a delay circuit that causes a delay $\Delta\phi=2\pi f\sqrt{LC}$. A preferred value for $\Delta\phi$ is $2\pi/n$, in which n is the number of subcircuits to be cascaded. The clock signal received on terminal 20 is preferably a sinusoidal signal, while the timed common power signal is preferably a pulsed signal.

Figure 2:
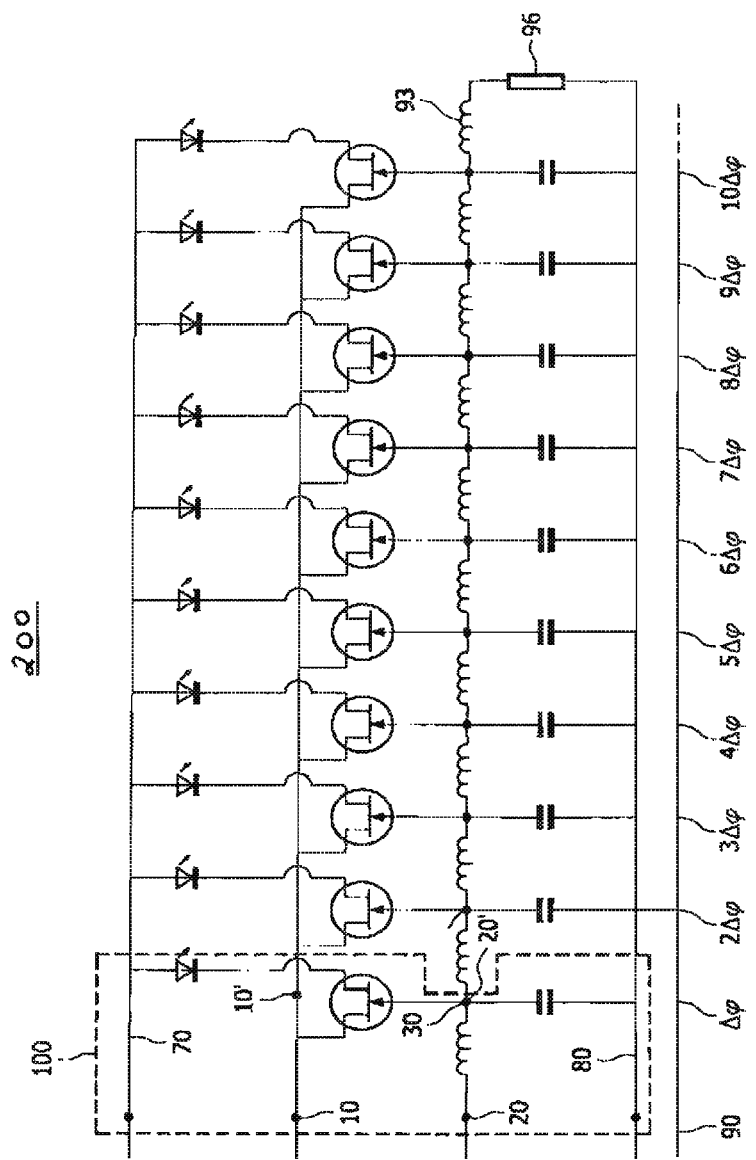
FIG. 2 shows an electrical circuit for switching a load among a plurality of loads.

FIG. 2 shows a circuit 200 formed by a plurality of n=10 cascaded subcircuits 100 according to FIG. 1b, in which the output terminal 30 of a subcircuit is coupled with the second input terminal 20' of a following subcircuit, i.e. a subcircuit which receives the clock signal with a larger delay. In this embodiment, a subcircuit is followed by a subcircuit on its right side. A sinusoidal clock signal applied to input terminal 20 will be output at output terminal 30 with a phase delay of $\Delta\phi$, as indicated on timeline 90. A timed common power signal offered on input 10 of a subcircuit will be available on input 10' of an adjacent subcircuit without a delay. Since a LED is powered when a low value of the timed common power signal on input 10 of the corresponding subcircuit coincides with a high value of the delayed clock signal at output 30 of the same subcircuit, the n-th LED can be powered by offering a low timed common power signal with a delay of n Δφ with respect to the clock signal offered on input 20.

In order to avoid reflection of the clock signal, the cascade circuit is provided with an inductor 93 and a resistance 96 coupled to the last output terminal Resistance 96 is referred to as "terminal resistance" in the art. In a practical embodiment of the circuit of FIG. 2, the inductances of the subcircuits have a value of 1 mH, and the capacitors of the subcircuits have a value of 100 pF. Inductor 93 has a value of 503 μH, and resistor 96 has a value of 3.1 kΩ. As a general rule, the value $Z_{term}$ of the terminal resistance is chosen to be about $Z_{term} = \sqrt{L/C}$.

The circuit is fed with a supply voltage of 10 Volts, and the timed common power signal has a duty cycle of 10%.

Figure 3:
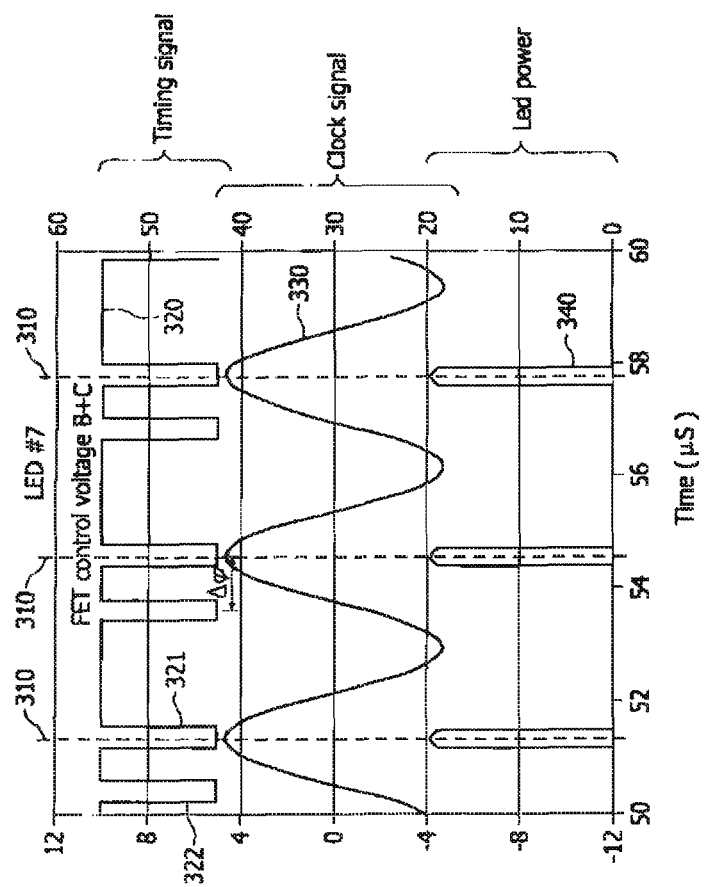
FIG. 3 shows a graph with signal waveforms for switching a load in the circuit of FIG. 2.

FIG. 3 shows a timing diagram in which the timed common power signal 320, the clock signal 330 and a LED power signal 340 are depicted for any LED in the circuit of FIG. 2. Dashed lines 310 are shown, which indicate moments on which the propagating clock signal has a maximum value at the output terminal of the subcircuit corresponding with said LED. It becomes clear from FIG. 3 that only pulses 321 of the timed common power signal 320 that are coincident with any of the lines 310 lead to powering the LED. Pulses 322, designated for a LED corresponding with an adjacent subcircuit are timed at instances Δφ between lines 310, when the clock signal has a maximum value at the output terminal of the adjacent subcircuit.

When the number of loads becomes large, for example about 50, it is also possible to use other than purely sinusoidal waveforms, for example square waves, which create pulses that rise steeper than the sinusoidals, enabling a more selective control of the switching element. These waveforms can be composed of multiple superimposed sinusoidals with different frequencies.

These waveforms, as well as the timing signals, can be accurately generated using simple electronics making use of the direct digital synthesis method. For generation of smooth waveforms, like sinusoidals, additional low-pass filters, such as RC filters may be used.

Figure 4:
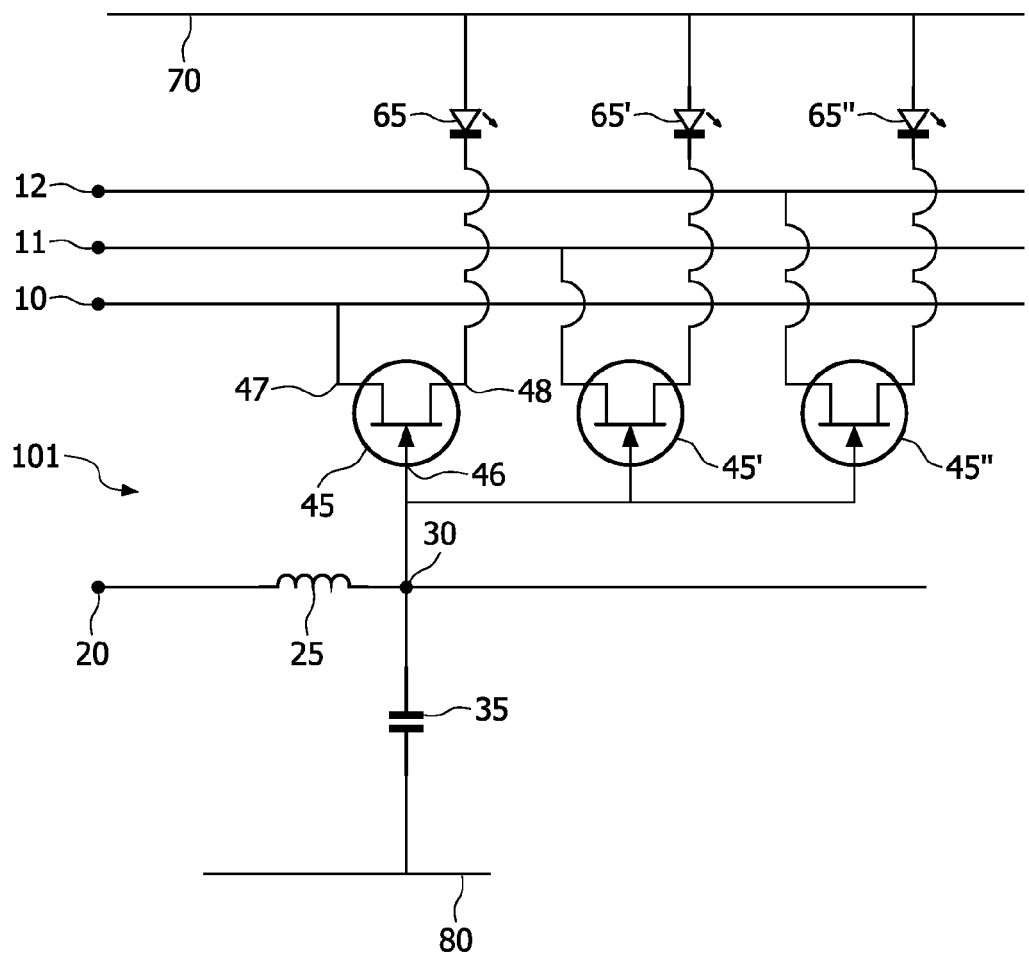
FIG. 4 shows a scheme of a subcircuit for forming a circuit according to a different embodiment of the present invention.

FIG. 4 shows a scheme of a subcircuit 101 for forming a circuit according to a different embodiment of the present invention. The subcircuit is essentially similar to the circuit 100 depicted in FIG. 1b, but additional input terminals 11 and 12 are present, as well as additional switches 45' and 45" with corresponding additional LED's 65' and 65". Herein, LED's 65, 65' and 65" preferably have different property, like a color of light they are configured to generate. For example, LED 65 is configured to generate red light, LED 65' is configured to generate green light and LED 65" is generated to generate blue light. In that case, on input terminal 10, a common power signal for the red LED's is offered, while on input terminals 11 and 12 timed common power signals for the green and the blue LED's are offered. When the value of the clock signal at output terminal 30 has a high value, the LED's 65, 65' and 65" are simultaneously connected with the common power signals on respective terminals 10, 11 and 12. A circuit composed of subcircuits 101 is especially advantageous for creating attractive dynamic color effects. It should, however, be understood that also circuits composed of subcircuits 100 can be implemented with LED's having mutually different properties, like a color of light they are configured to produce.

As required, a detailed embodiment of the present invention is disclosed herein; however, it is to be understood that the disclosed embodiment is merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. The terms "a" or "an", as used herein, are defined as one or more than one.

The invention claimed is:

1. An electrical circuit for addressing power to at least a selected load from a plurality of loads, the circuit comprising a plurality of cascaded subcircuits, each subcircuit for powering one of the loads, each subcircuit comprising:
   a first input terminal configured to receive a timed common power signal, wherein the timed common power signal is an essentially rectangular pulse signal;
   a delay element configured to delay a clock signal received on a second input terminal, the delay element further configured to output a delayed clock signal on an output terminal, wherein the delay element comprises a resonance circuit, which comprises an inductor and a capacitor; and
   a switching element configured to switch the timed common power signal to the load, the switching under control of the delayed clock signal.

2. The electrical circuit according to claim 1, wherein the output terminal of a subcircuit is coupled with the second input terminal of a following subcircuit.

3. The electrical circuit according to claim 1, further comprising a clock signal generator for generating the clock signal, and a power signal generator for generating the timed common power signal, the power signal generator being arranged for timing the power signal to power a selected load when the delayed clock signal switches on the switching element corresponding to said selected load.

4. The electrical circuit according to claim 3, wherein the clock signal generator comprises electronics making use of the direct digital synthesis method.

5. The electrical circuit according to claim 1, wherein the switching element comprises a JFET.

6. The electrical circuit according to claim 1, wherein the load comprises at least an LED.

7. The electrical circuit according to claim 1, further comprising means for preventing reflection of the clock signal after a last subcircuit.

8. The electrical circuit according to claim 1, wherein the clock signal is a sinusoidal signal.

9. The electrical circuit according to claim 1, comprising at least a third input terminal, for receiving at least a second timed common power signal.

10. The electrical circuit according to claim 1, comprising a first switching element for switching a first common timed power signal to a first load, the switching of the first switching element under control of the delayed clock signal, the circuit comprising at least a second switching element for switching a second common timed power signal to a second load, the switching of the at least second switching element under control of the delayed clock signal.

11. A method for addressing power to at least a selected load from a plurality of loads, in a circuit comprising a plurality of cascaded subcircuits, each subcircuit for powering one of the loads, the method comprising:
   receiving a timed common power signal, wherein the timed common power signal is an essentially rectangular pulse signal;

receiving a clock signal;
delaying the clock signal;
outputting the delayed clock signal; and
under control of the delayed clock signal, switching the common timed power signal to the load,
wherein the clock signal is delayed by a resonance circuit comprising an inductor and a capacitor.

12. The method according to claim 11, further comprising the steps of:
generating the clock signal;
generating the timed common power signal; and
timing the power signal such as to power a selected load when the common timed power signal is switched to said load.

* * * * *